Figure 1:
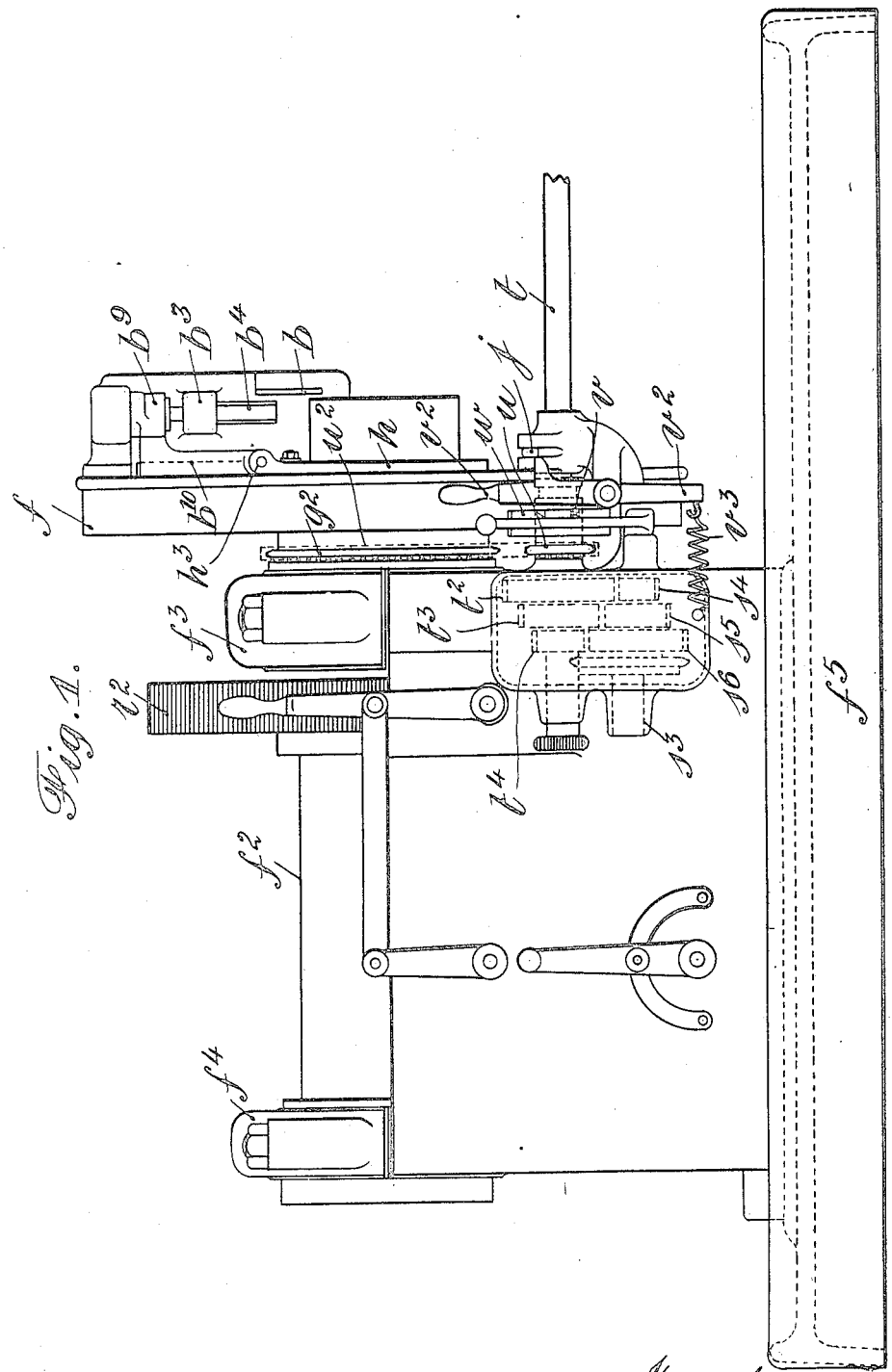

G. B. TAYLOR.
MACHINE FOR TURNING AND CUTTING OFF PIECES FROM A BAR OR TUBE.
APPLICATION FILED NOV. 30, 1914.

1,140,208.

Patented May 18, 1915.
4 SHEETS—SHEET 1.

Witnesses
M. E. McAade

Inventor
George B. Taylor

G. B. TAYLOR.
MACHINE FOR TURNING AND CUTTING OFF PIECES FROM A BAR OR TUBE.
APPLICATION FILED NOV. 30, 1914.

1,140,208.

Patented May 18, 1915.
4 SHEETS—SHEET 2.

Witnesses

Inventor
George B. Taylor

G. B. TAYLOR.
MACHINE FOR TURNING AND CUTTING OFF PIECES FROM A BAR OR TUBE.
APPLICATION FILED NOV. 30, 1914.

1,140,208.

Patented May 18, 1915.
4 SHEETS—SHEET 4.

UNITED STATES PATENT OFFICE.

GEORGE BENJAMIN TAYLOR, OF BIRMINGHAM, ENGLAND.

MACHINE FOR TURNING AND CUTTING OFF PIECES FROM A BAR OR TUBE.

1,140,208.

Specification of Letters Patent.

Patented May 18, 1915.

Application filed November 30, 1914. Serial No. 874,883.

*To all whom it may concern:*

Be it known that I, GEORGE BENJAMIN TAYLOR, subject of the King of Great Britain, residing at Bartholomew street, Birmingham, England, have invented certain new and useful Improvements in Machines for Turning and Cutting Off Pieces from a Bar or Tube, of which the following is a specification.

The invention provides an improved machine for turning and cutting off pieces from a bar or tube.

The kind of machine to which the invention relates is one in which the bar or tube is held stationary while the tools, similar to turning tools, revolve around said bar or tube with the spindle. Two, three or more of such tools, advanced by a common hand feed, have been coupled to operate upon a bar or tube to an equal extent by using said bar or tube as a rigid equalizing abutment compelling each tool to do the same amount of work.

The machine according to the invention is of the character aforesaid, but constructionally differs by the bearing carriers for the traversing screws of the tool slides being indirectly coupled across the face plate by a shiftable ring, by the idle movement for the equalization of the cut on all tools being arranged for within, or in combination with, the driving gear of the traversing screws without any disconnection of said gear, and by said bearing carriers and shiftable ring being applied to the face plate in a manner offering considerable resistance to movement. Certain gear wheels for revolving the traversing screws are carried in bearings of the back and front of the face plate, and are driven from an annulus freely and concentrically surrounding the hollow spindle at the back of the face plate. Combined with one of the tool slides is an adjustable piece, and with the face plate a trip arm held inwardly by a spring and projected outwardly by the adjustable piece to operate upon devices to automatically throw the tool feed out of action after the finish of the cutting off, or the turning, or at any moment of operation of the tools on the bar or tube. Also combined with the gear wheels and annulus aforesaid is a brake to hold the annulus stationary while the tool spindle continues to revolve, for the purpose of causing the tool slides to move outwardly to their normal positions again.

The constructional features of the machine hereinbefore indicated and the manner of combining same are illustrated in the accompanying drawings.

Figure 2:
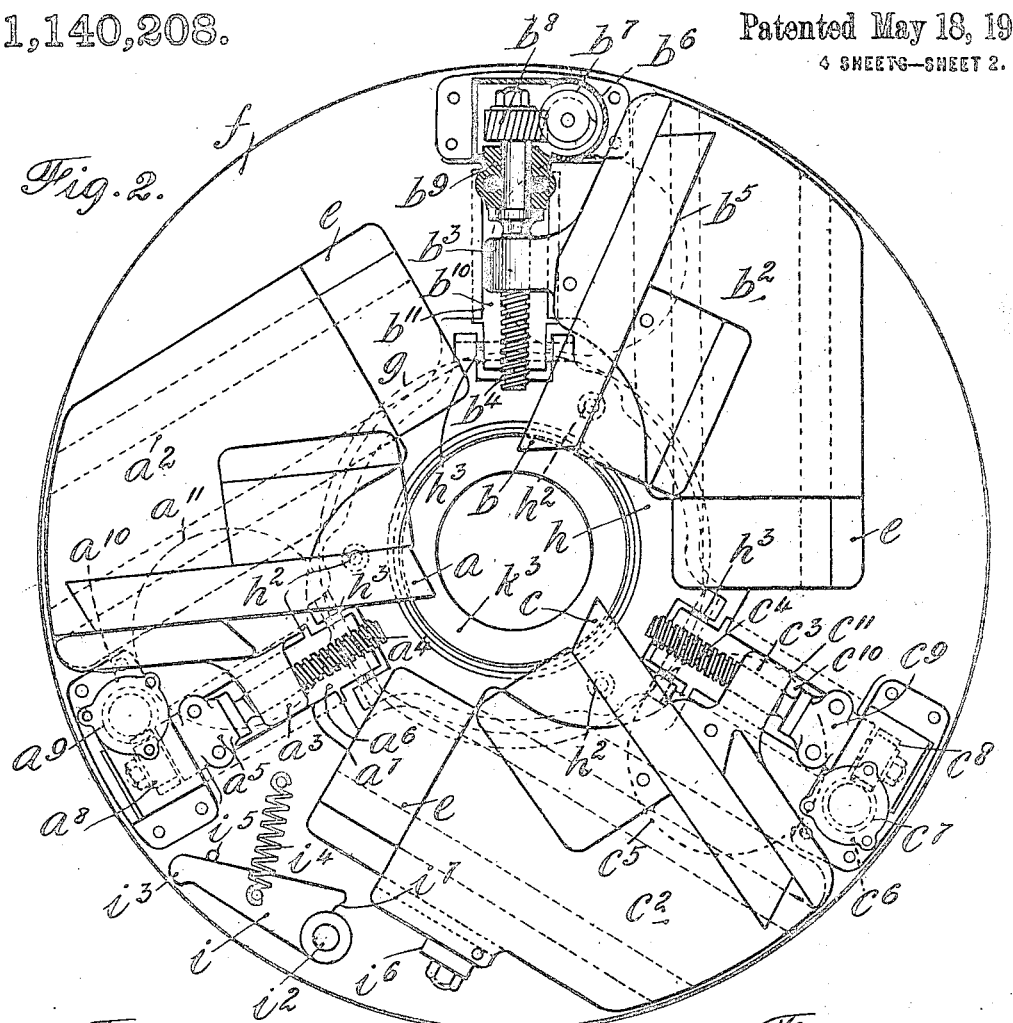
Figure 3:
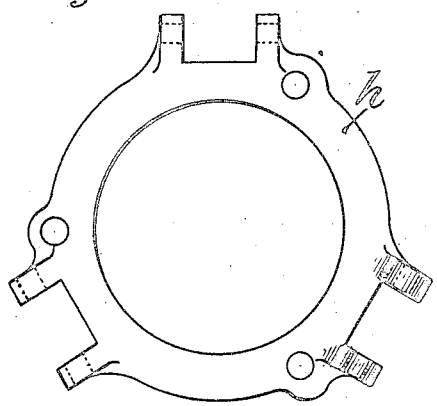
Figure 4:
Figure 5:
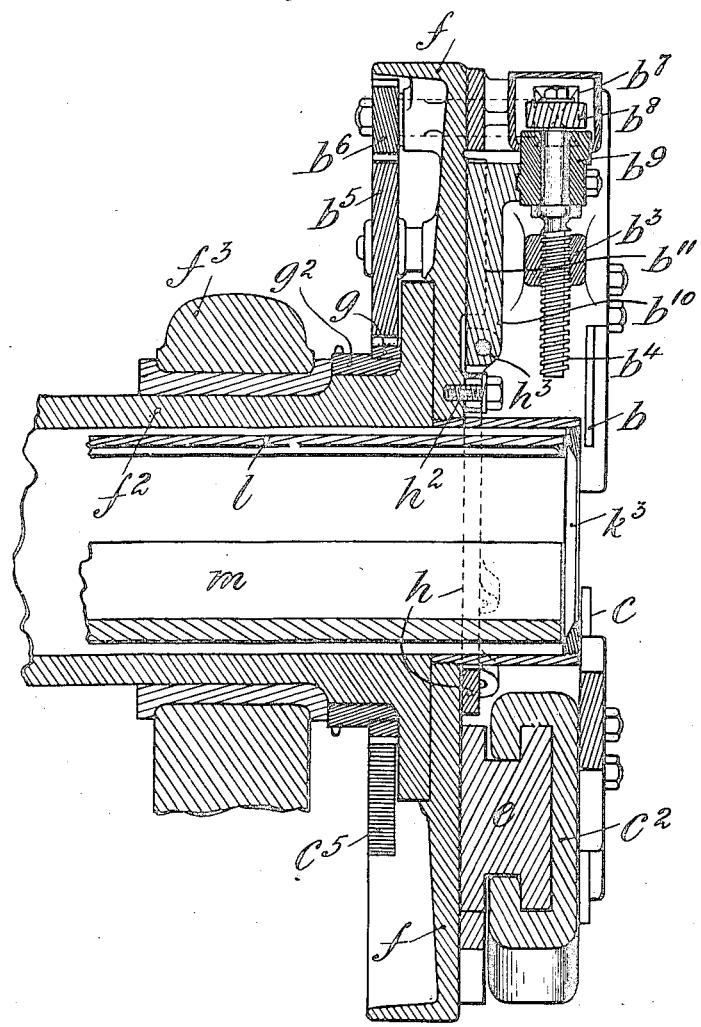
Figure 6:
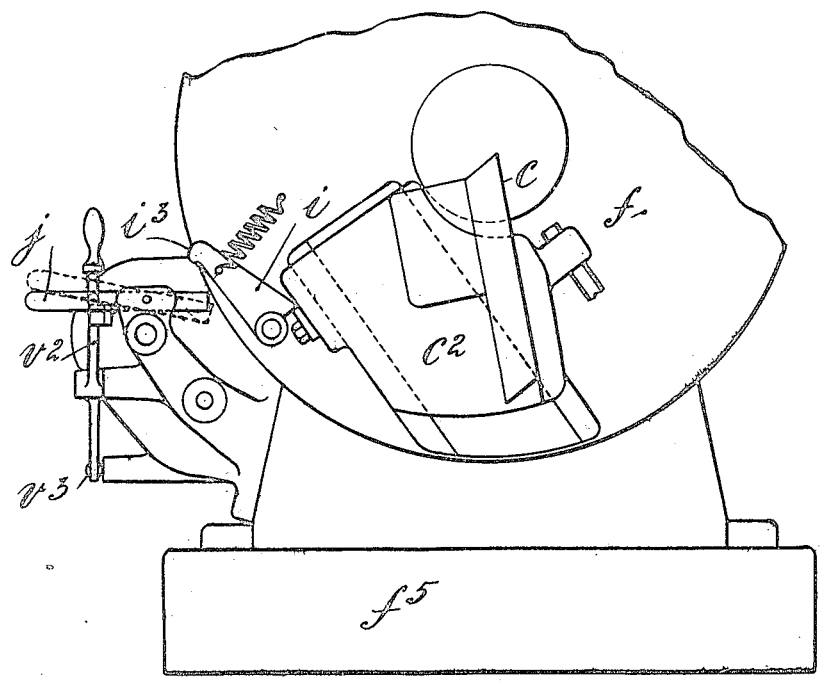

Figure 1 is a side elevation of as much of the complete machine as is necessary to understand the invention. Fig. 2 shows a face-plate end elevation only. Fig. 3 shows a face view of the coupling ring separate. Fig. 4 is an edge section of Fig. 3. Fig. 5 is an axial section through the face plate, part of the spindle, and the front bearing. Fig. 6 shows a diagram of the face-plate end to illustrate arrangements for automatically stopping the feed of the tools.

In the machine illustrated three cutting tools $a$, $b$, and $c$ are arranged for. The one $a$ is carried by the slide $a^2$, the one $b$ by the slide $b^2$, and the one $c$ by the slide $c^2$, and these slides are each truly fitted to carriers $e$ formed integral with the face plate $f$, which forms the greater part of the front of the machine and is mounted upon and revolved by the hollow spindle $f^2$. The slides move tangentially upon the face plate to move the edges of the cutting tools radially. The screw boxes of the respective slides are at $a^3$, $b^3$ and $c^3$, and the traversing screws for these slides are respectively at $a^4$, $b^4$, and $c^4$. The bearing for the screw $a^4$ is at $a^5$ upon a slide $a^6$ fitted to traverse a radially arranged guiding groove $a^7$ on the face plate. The screw $a^4$ is revolved by a worm wheel, $a^8$, secured to its one end, a worm, $a^9$, having bearings within the face plate, and gear wheels $a^{10}$, $a^{11}$, and $g$ mounted as to the ones $a^{10}$ and $a^{11}$ on the back of the face plate, and as to the one $g$ upon a chain wheel annulus $g^2$ freely and concentrically revoluble upon the spindle $f^2$. The gear wheel $g$ is a common one to the revolution of the other two traversing screws $b^4$ and $c^4$, it driving the gear wheels $b^5$ and $c^5$, which drive the gear wheels $b^6$, $c^6$, to whose respective spindles are connected the worms $b^7$, $c^7$, which respectively drive the worm wheels, $b^8$, $c^8$, upon the ends of the respective traversing screws $b^4$ and $c^4$. The bearings for the traversing screws $b^4$ $c^4$ are provided in like manner as the bearing $a^5$, that is to say the bearing $b^9$ is carried by a slide $b^{10}$ working in a groove $b^{11}$ of the face plate $f$, while the bearing $c^9$ is carried by a slide $c^{10}$ working in a guiding groove $c^{11}$ of said face plate.

The slides $a^6$, $b^{10}$ and $c^{10}$ are permanently coupled on the face plate by the coupling ring $h$, shown separately by Figs. 3 and 4. This ring $h$ is frictionally clamped against the face plate by the screw pins $h^2$, under the heads of which are spring washers, said pins passing through holes in the coupling ring much larger than the diameter of the pins so that the plate can have a limited movement in any direction about the pins. The slides $a^6$, $b^{10}$ and $c^{10}$ are connected to the coupling ring $h$ by pins, $h^3$, rigidly carried by the ring to slidably engage holes through the slides, but such engagement leaves a free movement of the pins within the holes of the slides in either direction axially of the pins, to compensate for the pull of the coupling friction ring $h$ on the slides being oblique or at an angle to the movement of said slides. The ring $h$ has a frictional resistance upon the face plate equal to supporting the tool slides and their traversing means against gravity, but the slides $a^2$, $b^2$ and $c^2$ have also frictional resistance to movement, as well as the slides $a^6$, $b^{10}$ and $c^{10}$. It is necessary, with reference to this part of the invention, that the driving gear for each of the traversing screws $a^4$, $b^4$, and $c^4$ should be so provided that the bearing for each screw can move bodily carrying the screw with it either toward or away from the work without the driving gear becoming at any time disconnected, the worm and worm wheel arrangement at the driving end of each traversing screw allowing of this.

It will be quite clear from Figs. 2 and 5 that the feed for the tools $a$, $b$, and $c$ is common, and constant while the feed is in operation; if through the bar to be operated upon not being fixed central of the tools, or from any inaccuracies in the formation of the bar, or for any other cause, one of the tools $a$, $b$ or $c$ should contact the bar before the others it will instead of operating (the feed of the tools being still in operation) to cut lack a cutting abutment, and will use the work (the bar or tube) as an equalizing abutment pulling the other tools into contact with the bar or tube; so that not until all the tools touch the bar or tube can the tool feed become effective for cutting, at which time the bearings of the traversing screws are held stationary. This equalizing arrangement also operates effectively to insure that the tool feed shall always be the same and equal to each tool, so that the one cannot do more work than the other.

The gear communicating the feed motion between the wheel $g$ and the traversing screws is applied at the back of the face plate to always revolve therewith and yet separately revolve thereon, but by holding the gear wheel $g$ stationary, through braking the chain wheel annulus $g^2$, the slides $a^2$, $b^2$ and $c^2$ with their tools are automatically moved back to their normal positions again: the speed of the chain wheel annulus $g^2$ during the operation of the tools being greater than the speed of the spindle $f^2$; by this arrangement it is not at any time necessary to stop the revolution of the spindle $f^2$.

In Fig. 5 $l$ indicates a stop of a known construction and manner of operation for measuring the length of the piece to be cut off from the bar or tube, while $m$ is a support for the piece while being cut off, and for pieces previously separated; all the cut off pieces passing through the hollow spindle to the rear end of the machine in the ordinary way in a machine of this character. The front end of the hollow spindle $f^2$ is partly closed by the ring $k^3$.

Upon the face plate $f$ is provided a trip arm $i$. This arm is hinged at $i^2$ to said face plate, and its free end $i^3$ is held flush with the periphery of said face plate by a spring $i^4$; a stop $i^5$ limiting the action of the spring in this direction. The slide $c^2$ carries an adjustable piece $i^6$ adapted to contact a shoulder $i^7$ of the trip arm $i$ after the tools $a$, $b$ and $c$ have been fed to a predetermined depth in the bar or tube when it is desired to stop the feed. The action of the piece $i^6$ on the trip arm projects its free end $i^3$, as shown by Fig. 6, and causes this end to operate upon a lever $j$, Figs. 1 and 6, to automatically throw the tool feed out of action, this being hereinafter more particularly referred to.

With reference more particularly to Figs. 1 and 6 the front bearing for the spindle $f^2$ is at $f^3$, and the rear bearing at $f^4$, both provided upon a base $f^5$, upon which is built the whole of the machine.

$r^2$ is a large gear wheel fast upon the spindle $f^2$ and is the driver to said spindle from a suitable main driving gear (not shown) by which said spindle may be driven at varying rates of speed.

$s^3$ is also a shaft revolved in any suitable way from the main driving gear at varying speeds, which are under control. This shaft $s^3$ has upon it three gear wheels $s^4$, $s^5$, $s^6$ working with three other gear wheels $t^2$, $t^3$ and $t^4$ to drive a further shaft $t$ upon which is mounted a chain wheel $u$ to, by a chain $u^2$, drive the chain wheel annulus $g^2$ hereinbefore described as loosely revoluble upon the spindle $f^2$. The gears $t^2$, $t^3$, and $t^4$ are always in mesh with the gears $s^4$, $s^5$, and $s^6$, but only one of them becomes effective at a time on the shaft $t$ by reason of a suitable key clutch arranged to carry this into effect from the drive of the shaft $s^3$, the purpose of said gears being to speed up the chain wheel annulus to three different speeds so that the feed of the tools $a$, $b$, and $c$ can be varied before cutting commences; these features forming no part of the invention.

On the shaft $t$ is a clutch $v$, hand and spring operative to disconnect the chain wheel $u$ from the shaft $t$, so that the feed of the tools may be stopped at any time. When the clutch is in operation the lever $j$, hereinbefore described, may hold it so by normally lying in the path of the hand lever, $v^2$, by which said clutch is put into operation against the action of the spring $v^3$. When the trip arm $i$ rocks the lever $j$ the latter frees the lever $v^2$ and permits the spring $v^3$ to act to make the clutch $v$ inoperative so that the drive of the chain wheel $u$ from the shaft $t$ is disconnected. If now the chain wheel $u$ is held stationary by the brake band $w$ the chain wheel annulus $g^2$ is also held stationary, which causes the slides $a^2$, $b^2$ and $c^2$ to automatically move back from the continued rotation of the spindle $f^2$ and the face plate $f$.

Instead of the ring $h$ being frictionally applied to the face plate, it may couple the bearing carriers of the traversing screws without having friction on said face plate, the necessary friction to resistance of movement of the slides and their parts by gravity being provided for in slides themselves, or in other additional parts of the machine connected with the slides for the specific purpose of creating friction.

Having now particularly described my invention what I claim and desire to secure by Letters Patent is:—

1. In a machine for turning and cutting off pieces from a bar, the combination of a hollow spindle, a face plate revolved thereby, a plurality of cutting tools arranged on said face plate, screws for moving said tools radially, bearing carriers for said screws, a shiftable ring connecting all of said bearing carriers of the screws, means for causing said bearing carriers and shiftable ring to offer considerable resistance to movement on said face plate, and gears to collectively revolve all the screws and so provided that the idle movement for the equalization of the tool feed takes place therein without any disconnection of said gears.

2. In a machine for turning and cutting off pieces from a bar, the combination of a hollow spindle, a face plate revolved thereby, a plurality of cutting tools arranged on said face plate and having screws for moving them radially, bearing carriers for said screws, a shiftable ring connecting all the bearing carriers of the screws, means for causing said bearing carriers and shiftable ring to offer considerable resistance to movement on said face plate, gear wheels carried upon the back and front of the face plate and on the screws to collectively revolve said screws and so provided that the idle movement for the equalization of the tool feed takes place therein without any disconnection of said gear wheels, and an annulus freely and concentrically surrounding the hollow spindle at the back of the face plate to drive said gear wheels.

3. In a machine for turning and cutting off pieces from a bar, the combination of a hollow spindle, a face plate revolved thereby, a plurality of cutting tools arranged on said face plate and having traversing screws for moving them radially, bearing carriers for said screws, a shiftable ring connecting all the bearing carriers of the traversing screws, means for causing said bearing carriers and shiftable ring to offer considerable resistance to movement on said face plate, gears to collectively revolve all the traversing screws and so provided that the idle movement for the equalization of the tool feed takes place therein without any disconnection of said gears, means for driving said gears including stopping means and a controlling device therefor embodying an adjustable piece connected to move with one of the cutting tools, and a trip arm carried upon the face plate and movable into action by said adjustable piece to operate said stopping means to interrupt the feed of the tools.

4. In a machine for turning and cutting off pieces from a bar, the combination of a hollow spindle, a face plate revolved thereby, a plurality of cutting tools arranged on said face plate and having screws for moving them radially, bearing carriers for said screws, a shiftable ring connecting all the bearing carriers of the screws, means for causing said bearing carriers and shiftable ring to offer considerable resistance to movement on said face plate, gear wheels carried upon the back and front of the face plate and on the screws to collectively revolve said screws and so provided that the idle movement for the equalization of the tool feed takes place therein without any disconnection of said gear wheels, an annulus freely and concentrically surrounding the hollow spindle at the back of the face plate to drive said gear wheels, and a brake device to hold the annulus stationary while the tool spindle continues to revolve, substantially as described.

In testimony whereof I have hereunto set my hand in presence of two subscribing witnesses.

GEORGE BENJAMIN TAYLOR.

Witnesses:
 GEO. FUERY,
 D. HEAKER.